United States Patent [19]
Wittenzellner

[11] 3,979,645
[45] Sept. 7, 1976

[54] PROTECTIVE CIRCUIT FOR SHORT-CIRCUIT AND OVERLOAD PROTECTION OF A POWER CIRCUIT

[75] Inventor: Ernst Wittenzellner, Munich, Germany

[73] Assignee: Siemens Aktiengesellschaft, Berlin & Munich, Germany

[22] Filed: Nov. 20, 1974

[21] Appl. No.: 525,556

[30] Foreign Application Priority Data
Dec. 5, 1973  Germany............................ 2360678

[52] U.S. Cl. ........................... 317/33 R; 317/33 VR
[51] Int. Cl.² ........................................... H02H 7/20
[58] Field of Search ...................... 317/33 R, 33 VR

[56] References Cited
UNITED STATES PATENTS
3,122,697   2/1964   Kauders ......................... 317/33 VR
3,899,718   8/1975   Schafe............................... 317/33 R

*Primary Examiner*—Harry Moose
*Attorney, Agent, or Firm*—Hill, Gross, Simpson, Van Santen, Steadman, Chiara & Simpson

[57] ABSTRACT

A protective circuit for short circuit and overload protection of a power circuit, particularly integrated power circuits, in which the input of the final stage of such power circuit is controlled over an AND gate having a second input connected to the output of a flip-flop circuit. The latter is set by a pulse generator to close the input circuit of the final stage and in case of an overload the flip-flop is reset in response to an overload sensor, whereby the AND gate is blocked, and the final stage input circuit opened, during the pulse intervals as long as such overload exists.

6 Claims, 1 Drawing Figure

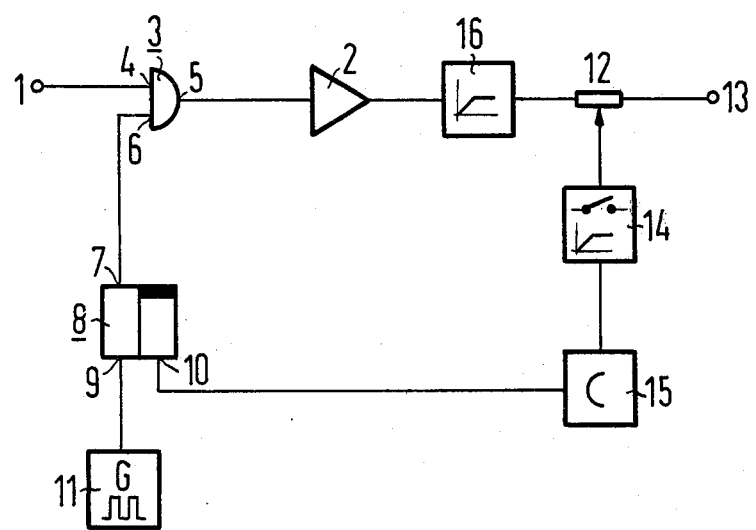

PROTECTIVE CIRCUIT FOR SHORT-CIRCUIT AND OVERLOAD PROTECTION OF A POWER CIRCUIT

BACKGROUND OF THE INVENTION

The invention is directed to a circuit arrangement for short-circuit and overload protection of a power circuit.

Monolithically integrated digital components can process only relatively small currents at their outputs and in control techniques where digital integrated circuits are, to a large extent, employed for the control of power elements, for example relays, lamps or magnetic control switches, currents up to 1A are required which, for reasons of uniformity in production and thus economical fabrication, should also be integrated monolithically. It is further required in such power circuits, as well as the standard digital circuits involved, that the outputs thereof are not destroyed in the presence of overloads or short circuits. At the mentioned voltages and currents, short circuit power losses up to several multiples of 10 watts may occur, which can instantly destroy the systems and their housings etc. It is therefore necessary that any overload protection provided either cuts off the current or radically reduces it in the presence of a short circuit or overload. If possible such overload protection likewise should be electronically controlled. Also, in the event such an overload ceases, the current should independently reestablish itself without any unduly large time delay.

Further, brief overloads, in such power circuits should be tolerated without responsive action taking place in the protective circuit, if for example, capacitive loads or bulbs with little cold resistance are being operated. If there is no overload the function of the protected circuit should in no way be influenced by the elements of the safety device.

Such a safety device could be achieved thermally, in which case the circuit would have to include a temperature sensor which activates a control circuit, whereby the power loss is reduced in the event of a short circuit or overload, and it is assured that the blocking layer temperatures do not increase over a maximum value at which no damage will occur. However, the construction of such a thermal safety device is quite difficult and high requirements would be necessary with respect to production tolerances. In addition, there is the disadvantage that in such a thermal protective device it would be difficult to maintain the control circuit at a stable level.

In another possibility, when the current exceeds the boundary along a negative resistance characteristic line, it is reduced to a value which is not dangerous. However, tolerance problems will likewise occur. Furthermore an ideal protection in the event of overload is not guaranteed since a sufficient differentiation between a genuine short circuit and the maximum operation cannot be effected. Further, special measures with respect to a delayed function would have to be taken in the operation of bulbs, etc.

BRIEF SUMMARY OF THE INVENTION

The present invention is directed to the production of a circuit which will provide short circuit and overload protection for a power circuit, in which the protective circuit does not exhibit the above referred to disadvantages but at the same time meets the specified requirements. The current should be independently reactivated after termination of an overload and without a major time delay. At the same time, brief overloads which are not dangerous should be possible without triggering the protective circuit.

The desired results are achieved, in accordance with the invention, by the provision of an AND gate in the input circuit to the final stage with the output of such gate being operatively connected to the final stage and an input of such gate circuit forming the input which is to be operatively connected to the final stage. An overload sensor responsive to the output conditions of the final stage is operatively connected to one input of a flip-flop, another input of which is operatively connected to a pulse generator, with the output of a flip-flop being connected to a second input of the AND gate. In the presence of an overload, the flip-flop is controlled over its first input by the overload sensor to open the input circuit to the final stage during the pulse intervals of the pulse generator. The latter is so adjusted that the pulse/interval ratio thereof is such that the net power loss, resulting in the event of a short circuit, is maintained below a value which would be damaging to the final stage.

Consequently, the length of a single pulse of the pulse generator should be of a magnitude such that current flowing through the final stage, in the event of a short circuit, cannot have a destructive effect. In other words, the pulse length must be smaller than the thermal time constant of the systems which would result in a dangerous energy loss.

In a preferred further development of the invention, a current limitation circuit is so connected to the final stage that the current flowing through the final stage during a single pulse of the pulse generator does not exceed a maximum non-damaging value. In a further advantageous development of the present invention, a delay member is disposed between the overload sensor and the associated flip-flop input to provide a suitable delay before actuation thereof.

In a preferred embodiment of a protective circuit, according to the invention, the overload sensor may comprise a suitable resistor which is traversed by the output current of the power circuit, with a voltage being taken off at a tap of such resistor. This voltage is adapted to control a threshold value switch which, in case of an overload, i.e. if the current reaches an undesirable value, transmits a control signal to the first input of the flip-flop.

BRIEF DESCRIPTION OF THE DRAWING

The DRAWING schematically illustrates a protective circuit in accordance with the invention.

DETAILED DESCRIPTION OF THE INVENTION

Referring to the drawing the reference numeral 1 designates the input of the final stage 2 of a power circuit. Interposed between the input 1 and the final stage 2 is an AND gate 3, the input 4 of which is connected to the input 1 and the output 5 of which is connected to the input of this final stage 2. The other input 6 of the AND gate 3 is operatively connected to the output 7 of a flip-flop circuit 8 which has two inputs 9 and 10, the input 9 of which is connected with a pulse generator 11.

The output of the final stage 2 extends over a voltage limiter 16 and resistor 12 to the output 13 of the power circuit. The resistor 12 is provided with a tap at which is derived a voltage which is conducted to a threshold value switch 14, the output of which is connected over a delay member 15 to the input 10 of the flip-flop circuit 8.

The flip-flop circuit 8 is constructed in the form of a bistable switching element which is set over the input 9 and reset over the input 10. In the reset condition the flip-flop 8 supplies, over the output 7, the logic signal 0 to the input 6 of the AND gate. The pulse generator 11 is designed as a free running generator and following application of the supply voltage thereto it will release the first pulse to the flip-flop 8, whereby there will appear at the output 7 the logic 1, which thus is applied to the input 6 of the gate 3. The latter thus is operatively conductive for signals from the input 1 to the final stage 2 even if the input 4 conducts the logic 1, which would be normal operation.

If the final stage is overloaded, the flip-flop 8 is reset, during the pulse interval, over the threshold value switch 14 and the delay member 15, thus releasing the logic 0 at its output. The AND gate 3 thus disconnects the final stage 2 from the input 1. During the next pulse the output 7 of the flip-flop is again at a value 1 for the duration of the pulse, and the final stage 2 thus is, in any case, operative. However, the current limiter 16 is operative to insure that the current does not reach an inadmissibly high value. The reaction threshold of the current limiter 16 naturally is higher than the value at which the threshold value switch 14 reacts.

If the overload still exists during the next following pulse interval, the flip-flop 8 will be reset and the final stage switched off. On the other hand, if the overload no longer exists the final stage will continue to operate in the normal manner.

For a clear understanding, the following logic table is presented which illustrates the conditions at the output 7 of the flip-flop 8 for respective conditions at the inputs 9 and 10 thereof:

| 9 | 10 | 7 | |
|---|----|---|---|
| 0 | 0 | X | (no change in condition) |
| 1 | 0 | 1 | |
| 0 | 1 | 0 | |
| 1 | 1 | 1 | |

The pulse/interval ratio of the generator 11 is determined by the permissible net power loss. In the embodiment illustrated the pulse/interval ratio, for example, may have a value of 1:50 which means that in the event of short circuit, assuming a supply voltage of 30 volts and a maximum current of 1A, without the protective device a power loss of 30 W would result, as compared with the protective device of only $(1/51) \cdot 30 \text{ W} \approx 0.59 \text{ W}$.

The delay member 15 merely effects a delay in the actuation of the protective device whereby line capacities can be charged without activation of the protective circuit.

It will be appreciated from the above disclosure that a protective circuit according to the invention is, in principle, utilizable for substantially any type of circuit, although its characteristics are most advantageous when applied to integrated power circuits.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A circuit arrangement for short circuit and overload protection of a power circuit having a final stage, comprising an AND gate, the output of which forms the input of such final stage, with one input of said gate forming the input to the final stage, an overload sensor operatively connected to the output of the final stage, a bistable flip-flop circuit having an output connected to a second input of said AND gate, operative to control transmission from said first gate input to said stage input, in dependence upon said flip-flop, the latter having a pair of inputs, a pulse generator operatively connected to supply pulses to a first input of said flip-flop, and means responsive to predetermine results at said sensor operatively connected to the second input of said flip-flop circuit for triggering the same in the presence of an overload, or short circuit, whereby said input to the final stage is disconnected, the pulse-interval ratio of said pulse generator being so determined that the net power loss in the event of a short circuit remains below a value damaging to said final stage.

2. A protective circuit according to claim 1, comprising in further combination, a current limiting circuit operatively connected to the final stage, which is operative to prevent a current flow, during a pulse from the pulse generator, reaching an inadmissible value.

3. A protective circuit according to claim 1, comprising in further combination, a delay member operatively disposed between the overload sensor and the associated input of the flip-flop, operative to provide a predetermined delay which will accommodate unobjectionable current surges over the final stage.

4. A protective circuit according to claim 1, wherein the overload sensor comprises a resistor over which the output current of the final stage flows, and threshold value switch operatively connected to a tap of said resistor operative to release a signal to the flip-flop when the output current of the final stage succeeds a predetermined permissible value.

5. A protective circuit according to claim 2, comprising in further combination, a delay member operatively disposed between the overload sensor and the associated input of the flip-flop, operative to provide a predetermined delay which will accommodate unobjectionable current surges over the final stage.

6. A protective circuit according to claim 5, wherein the overload sensor comprises a resistor over which the output current of the final stage flows and threshold value switch operatively connected to a tap of said resistance operative to release a signal to the flip-flop when the output current of the final stage succeeds a predetermined permissible value.

* * * * *